United States Patent
Slack et al.

(10) Patent No.: US 11,441,541 B2
(45) Date of Patent: Sep. 13, 2022

(54) MAIN SHAFT ASSEMBLY OF A WIND TURBINE

(71) Applicant: General Electric Renovables Espana, S.L., Barcelona (ES)

(72) Inventors: Robert Peter Slack, Seattle, WA (US); Roberto Leal Rodriguez, Queretaro (MX); Michael A. Garry, Asheville, NC (US); Matteo Bellucci, Schenectady, NY (US)

(73) Assignee: General Electric Renovables Espana, S.L., Barcelona (ES)

( * ) Notice: Subject to any disclaimer, the term of this patent is extended or adjusted under 35 U.S.C. 154(b) by 21 days.

(21) Appl. No.: 17/000,520

(22) Filed: Aug. 24, 2020

(65) Prior Publication Data

US 2022/0056886 A1 Feb. 24, 2022

(51) Int. Cl.
*F03D 15/00* (2016.01)
*F16C 3/02* (2006.01)

(52) U.S. Cl.
CPC .............. *F03D 15/00* (2016.05); *F16C 3/023* (2013.01); *F05B 2230/00* (2013.01); *F05B 2240/61* (2013.01); *F05B 2260/80* (2013.01)

(58) Field of Classification Search
CPC .................. F03D 15/00; F05B 2240/61; F05B 2270/331; F16C 3/023; F16C 2360/31
See application file for complete search history.

(56) References Cited

U.S. PATENT DOCUMENTS

| 7,160,083 | B2 | 1/2007 | Pierce et al. | |
| 8,123,480 | B2* | 2/2012 | Enevoldsen | G01B 17/04 |
| | | | | 416/61 |
| 2004/0151575 | A1 | 8/2004 | Pierce et al. | |
| 2011/0140431 | A1 | 6/2011 | Landa et al. | |
| 2011/0246131 | A1* | 10/2011 | Madge | G01B 21/32 |
| | | | | 702/150 |
| 2014/0119914 | A1* | 5/2014 | Schieke | F03D 7/02 |
| | | | | 416/1 |
| 2018/0100538 | A1* | 4/2018 | Hyson | F16C 3/023 |

OTHER PUBLICATIONS

European Search Report for EP Application No. 21192581.3, dated Jan. 20, 2022.

* cited by examiner

*Primary Examiner* — Christopher Verdier
*Assistant Examiner* — Maxime M Adjagbe
(74) *Attorney, Agent, or Firm* — Dority & Manning, P.A.

(57) ABSTRACT

A main shaft assembly of a wind turbine and method for manufacturing the same are provided. Accordingly, the main shaft assembly includes a structural/shaft body defining a cavity therein. The shaft body is configured to transmit a load of the wind turbine developed in response to the wind. An inner body is located within the cavity. The inner body is non-loadbearing with respect to the load. At least one sensor is coupled to the inner body and positioned within the cavity for detecting a deflection of the shaft body in response to the load.

17 Claims, 10 Drawing Sheets

MAIN SHAFT ASSEMBLY OF A WIND TURBINE

FIELD

The present disclosure relates in general to wind turbines, and more particularly to a main shaft assembly of the wind having an embedded sensor.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a rotor shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to an electrical grid.

The loads generated by the wind turbine in response to the wind typically are carried by various structural bodies of the wind turbine. For example, at least a portion the load generated by the rotor may be transmitted to the gearbox via the rotor shaft (also referred to as the main shaft). These loads may result in a bending of the shaft. Known control systems utilize bending moment measurements in order to manage the wind turbine's response to the wind.

Typically, measuring the deflection of the shaft may involve securing a sensor to an additional component of the wind turbine and directing the sensor toward the shaft to be measured. For example, a known approach is to secure a plurality of sensors to a main bearing housing in order to detect a deflection of the main shaft flange relative to the main bearing housing. However, as the main bearing typically supports the shaft, loads sufficient to generate the bending moment may also result in a movement of the main bearing housing. This movement may reduce the fidelity of the deflection measurements. Additionally, the rotor shaft is typically in motion. Therefore, using known approaches, the sensors are generally directed at a moving surface, which may further reduce the accuracy of the system. Furthermore, the component supporting the sensors and the component to be measured may be formed from different materials and may, therefore, exhibit different degrees of movement in response to the load. Accordingly, it may be desirable to utilize a structural assembly which permits a more accurate detection of displacement of the main shaft than is presently available using known systems.

Thus, the art is continuously seeking new and improved systems and methods that address the aforementioned issues. As such, the present disclosure is directed to an improved main shaft assembly of a wind turbine and methods of manufacturing the same.

BRIEF DESCRIPTION

Aspects and advantages of the invention will be set forth in part in the following description, or may be obvious from the description, or may be learned through practice of the invention.

In an aspect, the present disclosure is directed to a shaft assembly of a wind turbine. The shaft assembly may include a shaft body defining a cavity therein and a load path for transmitting a load generated by the wind turbine in response to the wind. The shaft assembly may also include an inner body disposed within the cavity and coupled to the shaft body. The inner body may be non-loadbearing with respect to the load. The shaft body and the inner body may be concentric and have a synchronized rate rotation about an axis. Additionally, the shaft assembly may include at least one sensor coupled to the inner body and positioned within the cavity for detecting a deflection of the shaft body in response to the load.

In an embodiment, coupling the sensor(s) to the inner body may define a physical separation between the sensor(s) and an adjacent wall of the cavity in a radial direction.

In an additional embodiment, the sensor(s) may include a proximity sensor. The proximity sensor may be configured to indicate a radial deflection of the shaft body.

In a further embodiment, the sensor(s) may include an array of sensors disposed at a first axial location of the axis. The array of sensors may circumscribe the inner body. Each sensor of the array of sensors may define a circumferential separation with at least one adjacent sensor of the array of sensors.

In an embodiment, the sensor(s) may be coupled to the inner body at a first axial location along the axis. The inner body may be coupled to the shaft body at a second axial location within the cavity. The inner body may form a cantilever extending at least axially between the second axial position and the sensor(s).

In an additional embodiment, the shaft body and the inner body may be a unitary body having an absence of a joint therebetween.

In a further embodiment, the inner body may be coupled within the cavity after formation. The shaft body may be a first material. The inner body may be a second material which is different than the first material.

In another aspect, the present disclosure is directed to a component assembly of a wind turbine. The assembly may include a wind turbine component. The wind turbine component may include an outer body defining a cavity therein. The outer body may define a load path for transmitting a load of the wind turbine therethrough. The wind turbine component may also include an inner body disposed within the cavity of the outer body portion. The inner body may be non-loadbearing with respect to the load. Additionally, the component assembly may include the sensor(s) coupled to the inner body and positioned within the cavity for detecting a deflection of the outer body in response to the load.

In an embodiment, the outer body and the inner body may be rotatable during operation of the wind turbine. The outer body and the inner body may be concentric and may have a synchronized rate of rotation about an axis.

In an additional embodiment, coupling the sensor(s) to the inner body may define a physical separation between the sensor(s) and an adjacent wall of the cavity.

In a further embodiment, the sensor(s) may be an array of sensors disposed at a first axial location along an axis of the outer body portion. Each sensor of the array of sensors may define an angular separation with at least one adjacent sensor of the array of sensors relative to the axis.

In an embodiment the sensor(s) may be coupled to the inner body at a first axial location along an axis of the outer body and the inner body may be coupled to the outer body at a second axial location within the cavity. The inner body may form a cantilever extending at least axially between the second axial position and the sensor(s).

In an additional embodiment, the component assembly may also include at least one second sensor coupled to the inner body at a third axial location. The second axial location may be disposed between the first axial location and the third axial location.

In a further embodiment, the wind turbine component may be a rotor blade, a high-speed shaft, a low-speed shaft, a rotatable hub, rotor support spindle and/or a tower of the wind turbine.

In yet another aspect, the present disclosure is directed to a method for manufacturing a shaft assembly of a wind turbine. The method may include forming a shaft body defining a cavity extending in a radial direction. The shaft body may also define a load path for transmitting a load generated by the wind turbine in response to a wind. The method may also include disposing an inner body within the cavity in axial and rotational alignment with an axis of the shaft body. The inner body may be non-loadbearing with respect to the load. Additionally, the method may include coupling the sensor(s) to the inner body within the cavity. The sensor(s) may be configured to detect a radial deflection of the shaft body in response to the load. The method may also include any of the operations and/or features described herein.

In an embodiment, the sensor(s) may be coupled to the inner body at a first axial location along the axis. The method may further include coupling the inner body to the shaft body at a second axial location within the cavity so as to form a cantilever extending at least axially between the second axial position and the sensor(s). The sensor(s) may have a first sensitivity at a first cantilever axial length and a second sensitivity corresponding to a second cantilever axial length. The second cantilever axial length may be greater than the first cantilever axial length, and the second sensitivity may be greater than the first sensitivity.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
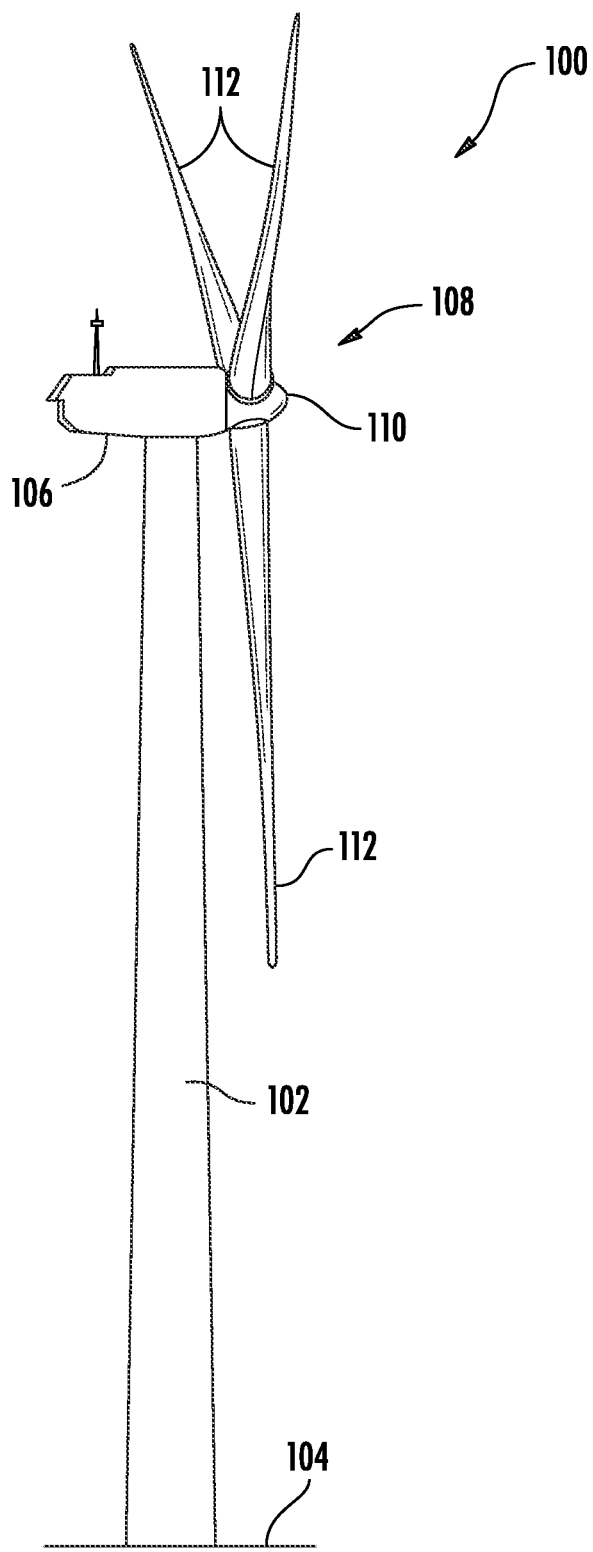
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to a component assembly of a wind turbine, such as a shaft assembly and methods of manufacturing the same. In particular, the present disclosure includes a wind turbine component, such as a rotor shaft, a wind turbine blade, a rotatable hub, a rotor support spindle or a tower. The wind turbine component may be hollow or otherwise define a cavity. As a structural element of the wind turbine, the wind turbine component may also define a load path for transmitting a load of the wind turbine which is generated in response to the wind. For example, when configured as a wind turbine blade, the component may transmit a load generated by a portion of the blade to the rotating hub. Similarly, the component may transmit the load generated by the blades from the rotor to the gearbox and/or the generator. Alternatively, the component may be the wind turbine tower and may, therefore, transmit the loads to the foundation.

In addition to the outer body, the component assembly may also include an inner body positioned within the cavity. The inner body may be non-loadbearing with respect to the load carried by the outer body. For example, when configured as a rotor shaft, the outer body may transmit the load, but the load may not be experienced by the inner body. Accordingly, the inner body may not react to the load. This may mean that inner body does not bend, or otherwise deflect in response to a load even though the outer body may bend/deflect in response to the load.

At least one sensor may be secured to the inner body and positioned within the cavity of the outer body. The sensor(s) may be positioned to detect a deflection of the outer body in response to the load. For example, because the inner body does not deflect in response to the load, a radial distance between the inner body and the outer body may vary with the deflection of the outer body in response to the load. This distance may indicate the degree of deflection/bending of the outer body and may, therefore, be utilized by a controller to control the wind turbine in response to the wind.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) of an electrical system 150 (FIG. 2) positioned within the nacelle 106 to permit electrical energy to be produced.

The wind turbine 100 may also include a controller 200 centralized within the nacelle 106. However, in other embodiments, the controller 200 may be located within any other component of the wind turbine 100 or at a location outside the wind turbine. Further, the controller 200 may be communicatively coupled to any number of the components of the wind turbine 100 in order to control the components. As such, the controller 200 may include a computer or other suitable processing unit. Thus, in several embodiments, the controller 200 may include suitable computer-readable instructions that, when implemented, configure the controller 200 to perform various different functions, such as receiving, transmitting and/or executing wind turbine control signals.

Figure 2:
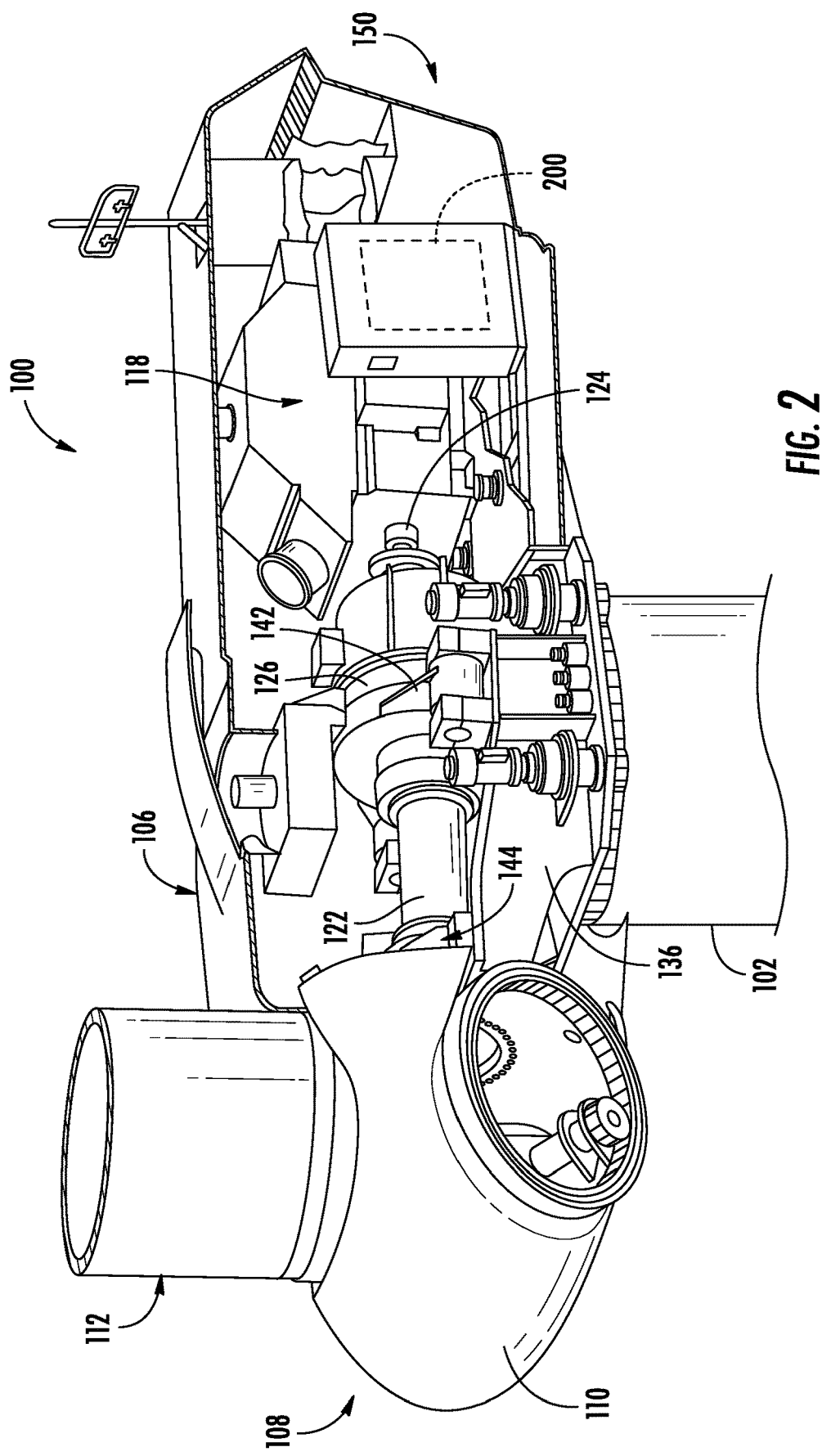
FIG. 2 illustrates a perspective, internal view of one embodiment of a nacelle of the wind turbine according to the present disclosure.
Figure 3:
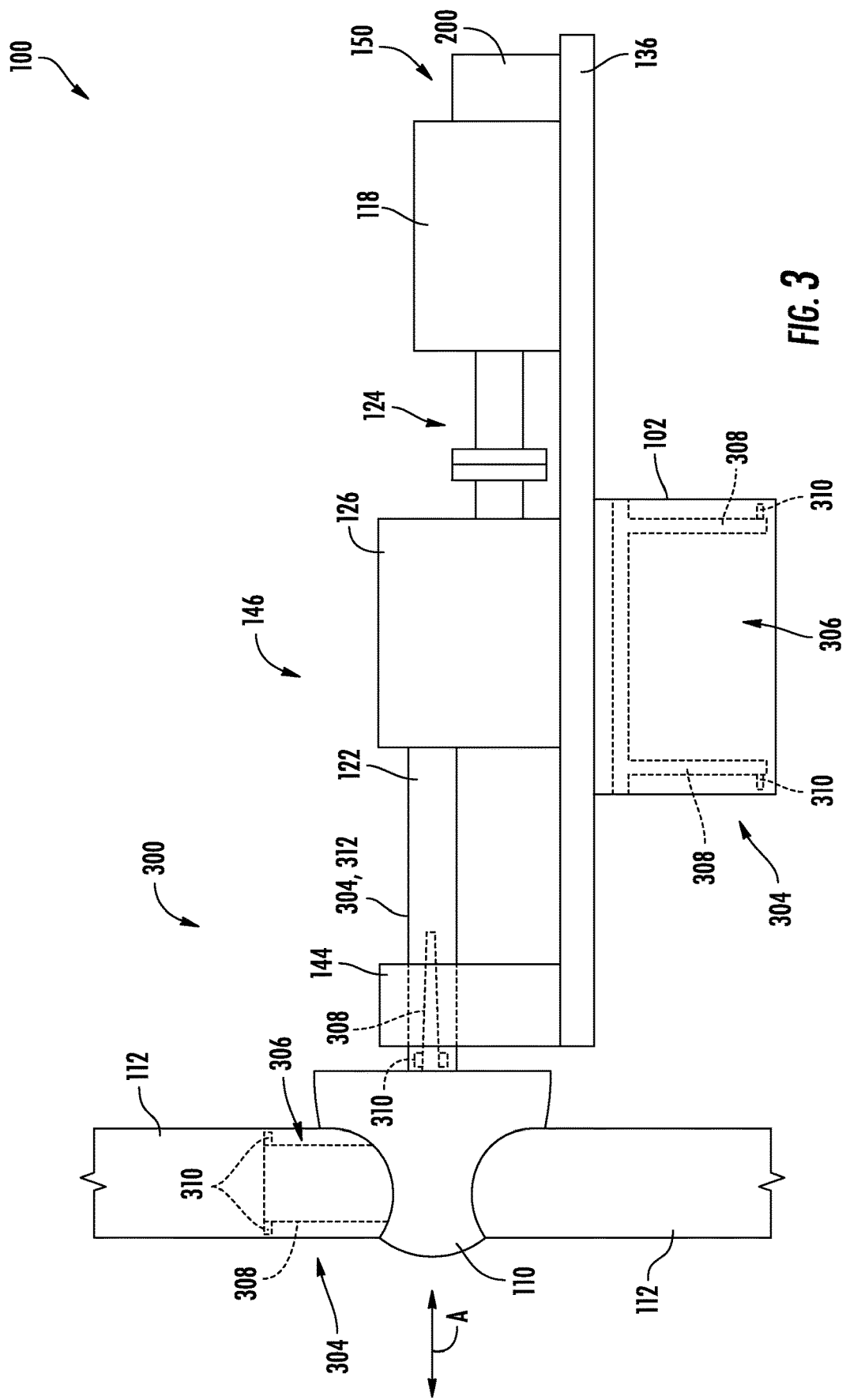
FIG. 3 illustrates a schematic diagram of one embodiment of the wind turbine according to the present disclosure.

Referring now to FIGS. 2 and 3, a simplified, internal view of one embodiment of the nacelle 106 and a schematic diagram of one embodiment of a drivetrain 146 of the wind turbine 100 shown in FIG. 1 are illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a high-speed shaft 124 of the generator 118 through an optional gearbox 126 connected to a bedplate support frame 136 by one or more torque arms 142. As is generally understood, the rotor shaft 122 may provide a low-speed, high-torque input to the gearbox 126 in response to rotation of the rotor blades 112 and the hub 110. The gearbox 126 may then be configured with a plurality of gears to convert the low-speed, high-torque input to a high-speed, low-torque output to drive the high-speed shaft 124 and, thus, the generator 118. In an embodiment, the gearbox 126 may be configured with multiple gear ratios so as to produce varying rotational speeds of the high-speed shaft for a given low-speed input, or vice versa.

In an embodiment an electrical system 150 of the wind turbine 100 may include various components for converting the kinetic energy of the rotor 108 into an electrical output in an acceptable form to a connected power grid. For example, in an embodiment, the generator 118 may be a doubly-fed induction generator (DFIG). The generator 118 may be may provide an output multiphase power (e.g. 3-phase power) to an electrical grid.

Referring still to FIG. 3, and to FIGS. 4-8, sectional views of multiple embodiments of a component assembly 300 of the wind turbine 100 are presented. In an embodiment, the component assembly 300 may include a wind turbine component, such as the rotor blade 112, the tower 102, the low-speed shaft 122, the high-speed shaft 124 a rotatable hub 108, and/or a rotor support spindle. The wind turbine component may include an outer body 304. The outer body 304 may define a load path for transmitting a load of the wind turbine 100 in response to a wind. In other words, the outer body 304 may be deemed to be a load-bearing body. The outer body 304 may also define a cavity 306 therein. In an embodiment, an inner body 308 may be disposed within the cavity 306. The inner body 308 may be non-loadbearing with respect to the load. In other words, the inner body 308 may be formed so as to be disconnected from the load path defined by the outer body 304, thereby being isolated from the load of the wind turbine 100. Additionally, at least one sensor 310 may be coupled to the inner body 308 and positioned within the cavity 306. The sensor(s) 310 may be configured to detect a deflection of the outer body 304 in response to the load. It should be appreciated that the outer body 304 may carry the weight of the blade(s) 112, the rotor 108 and/or the nacelle 106. The outer body 304 may also provide the load path for torsional, thrust, bending, and/or shear load components of a load developed by the wind turbine 100 in response to wind.

In an embodiment, the sensor(s) 310 may be positioned within the cavity 306 but may be coupled to the outer body 304 rather than to the inner body 308. In such an embodiment, the sensor(s) 310 may be configured to detect a deflection of the outer body 304 relative to the inner body 308. In other words, the inner body 308 may serve as a reference surface which does not deflect in response to the load.

Figure 8:
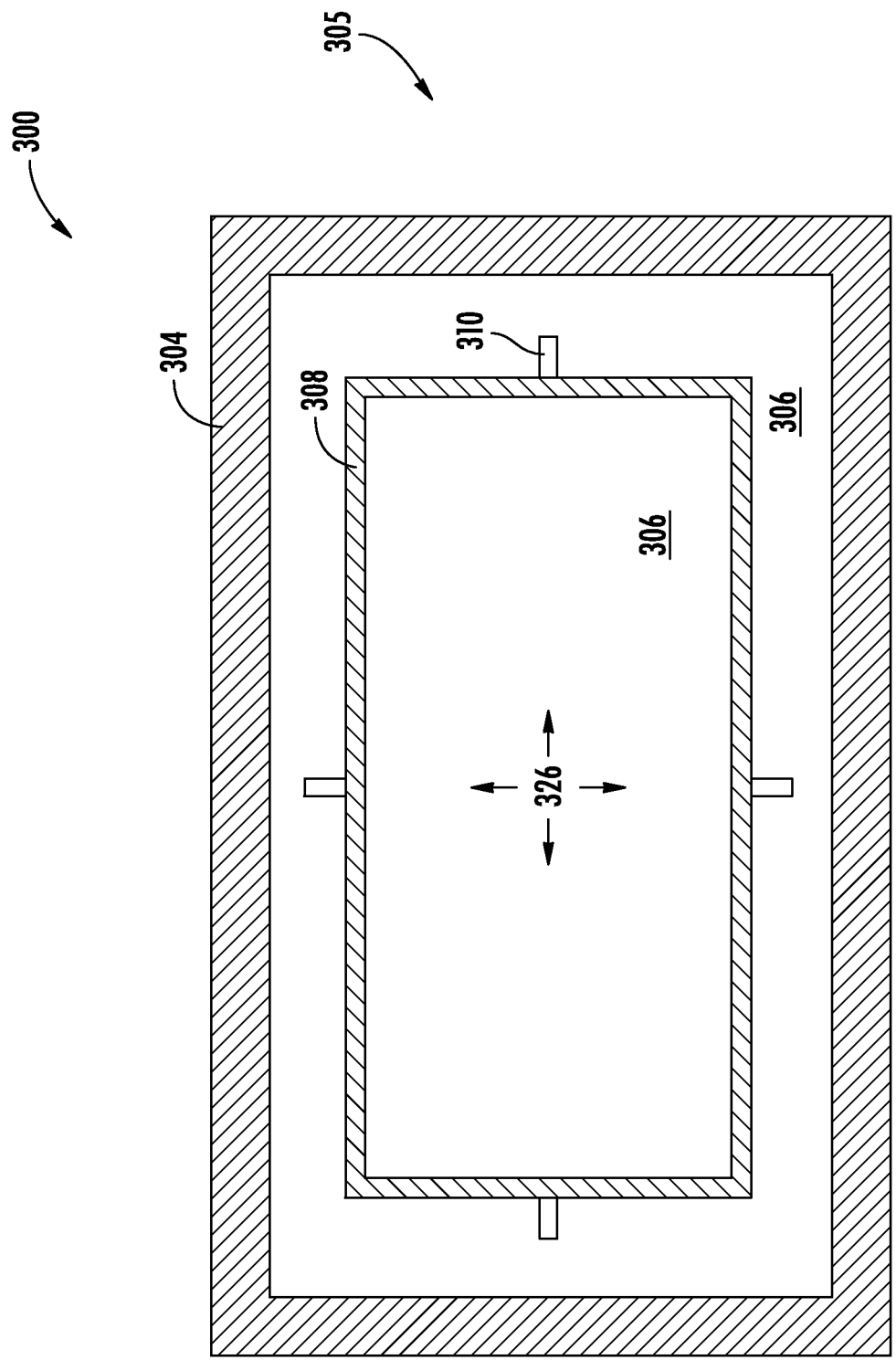
FIG. 8 illustrates a cross-sectional view of one embodiment of a component assembly of the wind turbine according to the present disclosure.

In an embodiment, the outer body 304 may have a plurality of generally circular cross sections 305 such that the outer body 304 may be generally cylindrical. In additional embodiment, the plurality of generally circular cross sections 305 may have a varying plurality of diameters such that the outer body 304 may include at least one tapered or flared portion. In a further embodiment as depicted in FIG. 8, the outer body 304 may have a plurality of generally rectilinear cross sections 305. Accordingly, the outer body 304 may be formed as a box beam or other similar structural member.

In an embodiment, the outer body 304 and the inner body 308 may be rotatable during a wind turbine operation. In an embodiment, the outer body 304 and the inner body 308 may be concentric. Additionally, the outer body 304 and the inner body 308 may have a synchronized rate of rotation about an axis(A). The axis(A) may be the axis of rotation of the outer body 304. Accordingly, as particularly depicted in FIGS. 3 and 4, in an embodiment, the component assembly 300 may be a shaft assembly 302 of the wind turbine 100. In an embodiment, the shaft assembly 302 may, for example, be a rotor shaft 122 or a high-speed shaft 124. In such an embodiment, the outer body 304 may be a shaft body 312. It should be appreciated that any operation or feature disclosed herein with reference to the component assembly 300 and/or the outer body 304 may be equally applicable to embodiments having the shaft assembly 302 and/or the shaft body 312.

Figure 4:
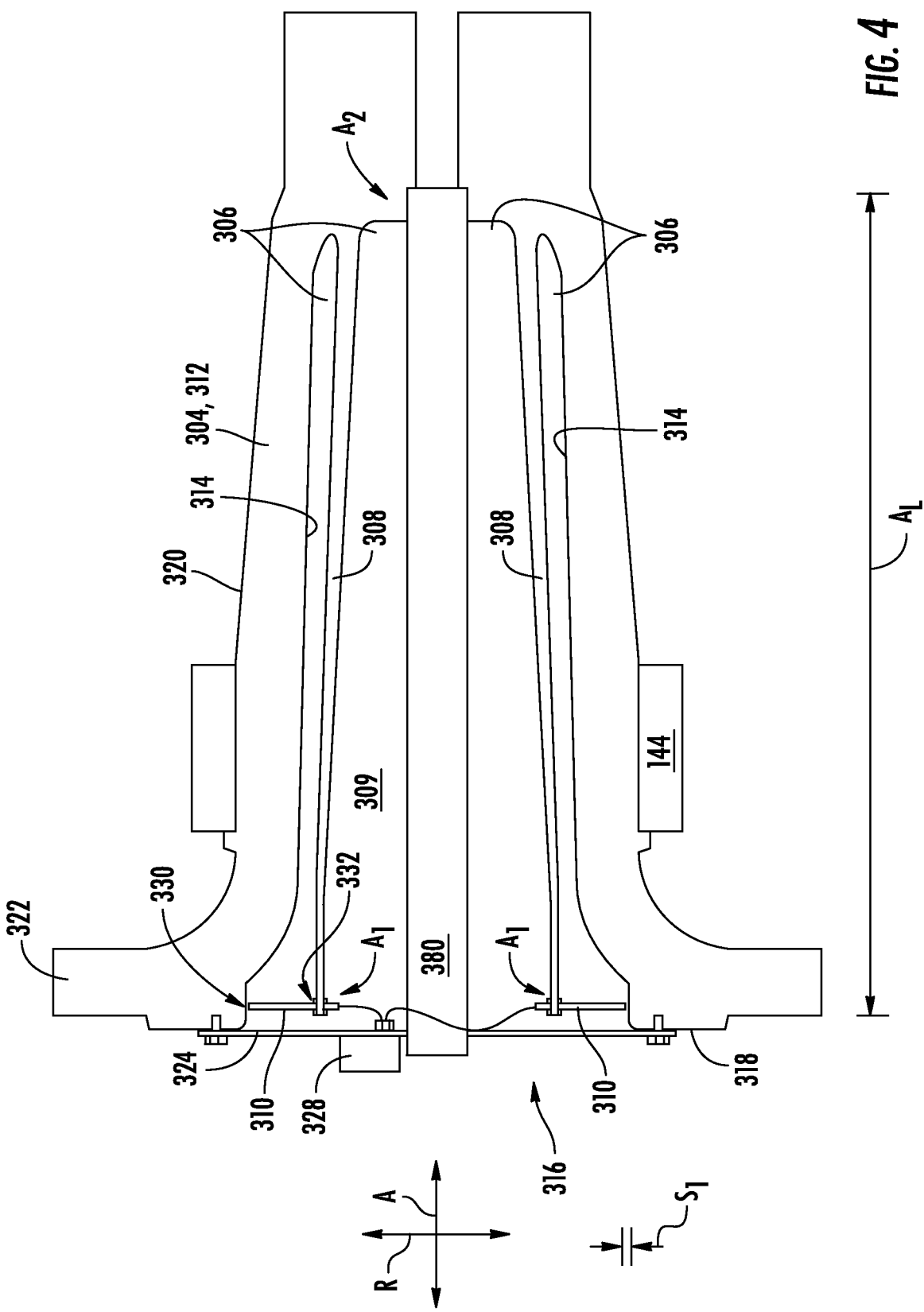
FIG. 4 illustrates a sectional view of one embodiment of a component assembly of the wind turbine according to the present disclosure.
Figure 5:
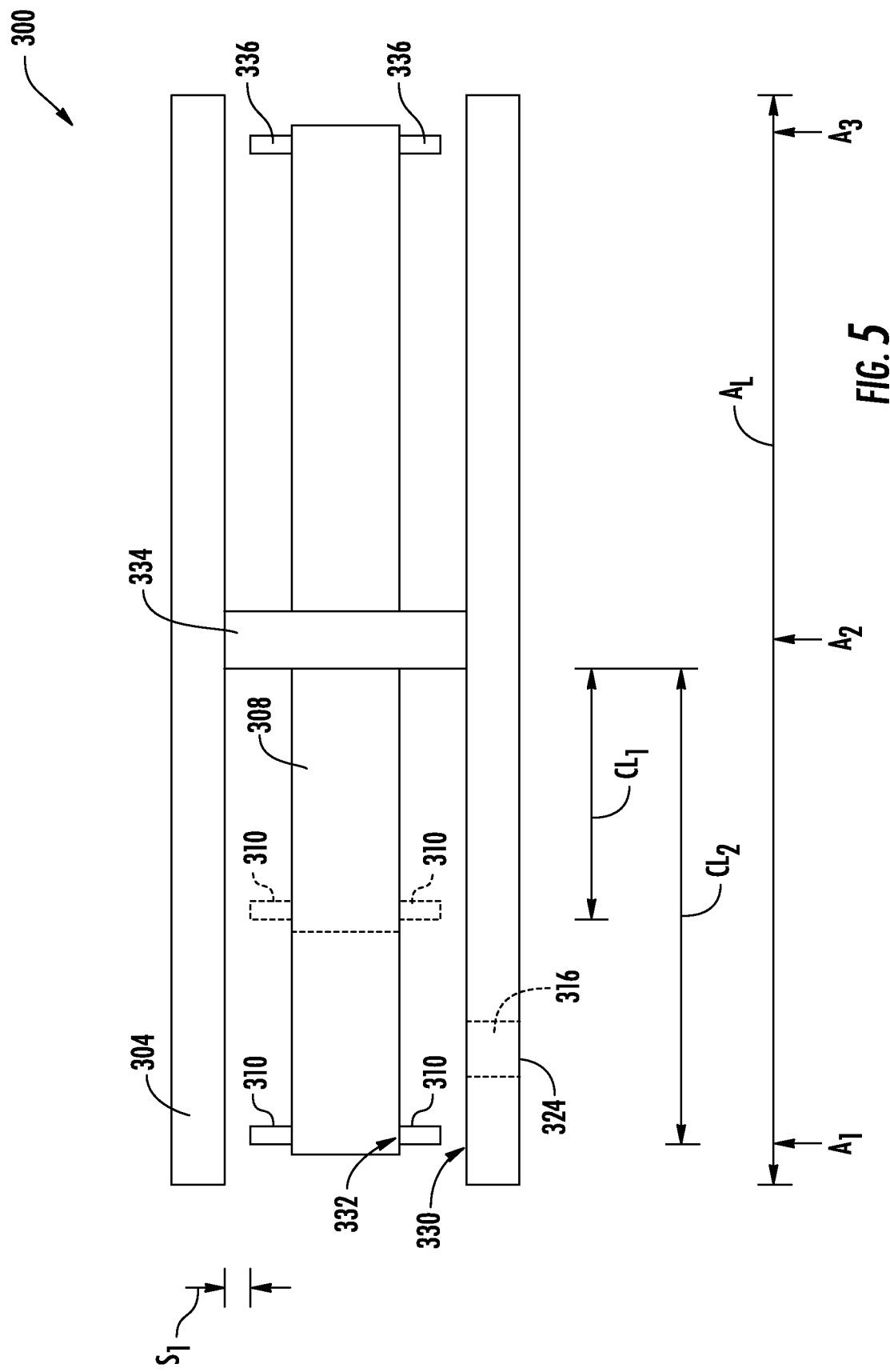
FIG. 5 illustrates a sectional side overlay view of one embodiment of embodiments of a component assembly of the wind turbine according to the present disclosure.
Figure 6:
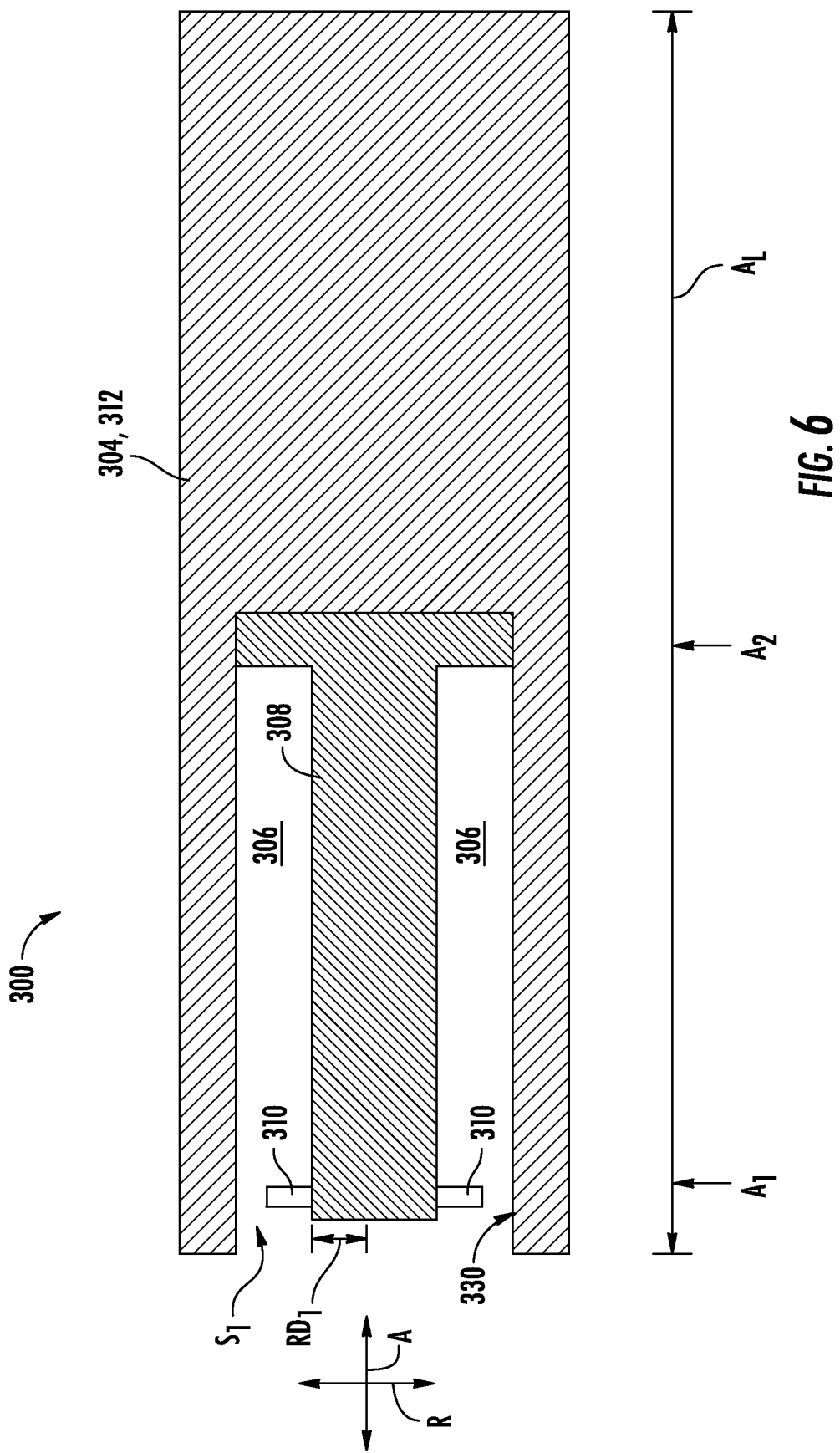
FIG. 6 illustrates a sectional side view of one embodiment of a component assembly of the wind turbine according to the present disclosure.

As depicted in FIGS. 4-6, in an embodiment, the cavity 306 may be in axial alignment with the outer body 304. The cavity 306 may extend in an axial direction at least partially along an axial length ($A_L$) of the outer body 304. In an embodiment, the cavity may be defined by a cavity wall 314, which may also be an inside surface of the outer body 304. In an additional embodiment, the cavity 306 may define an opening 316 in the outer body 304. For example, the opening 316 may be formed in an axial face 318 of the outer body 304 and/or in an outer surface 320 of the outer body 304. In at least one embodiment, the axial face 318 may be defined by a flange 322 of the shaft body 312. Accordingly, in an embodiment, the opening 316 may facilitate access to a component disposed within the cavity 306. As such, in at least one embodiment, a sealing member 324 may be coupled across the opening 316. It should be appreciated that with the sealing member 324 coupled to the outer body 304, the components of the assembly 300 within the cavity 306 may, in an embodiment, not be seen, sensed, observed, monitored, measured and/or otherwise detected by a sensor disposed externally to the outer body 304. In other words, the inner body 308 and the sensor(s) 310 may, in an embodiment, be entirely encapsulated by the cavity 306.

In an embodiment, the coupling of the sensor(s) 310 to the inner body 308 at a first axial location ($A_1$) may define a physical separation ($S_1$) between the sensor(s) 310 and an adjacent cavity wall 314 of the cavity 306, such as an adjacent cavity wall 314 in a radial direction (R). As such, the sensor(s) 310 may monitor the deflection of the outer body 304 without any physical contact with the inside surface of the outer body 304 and communicate the detected deflection to the controller 200. As such, in an embodiment, the sensor(s) 310 may be a proximity sensor (e.g., a non-contact detector) that is configured to indicate a radial deflection of the shaft body 312 without requiring physical contact with the sensed surface. In an embodiment, the proximity sensor may be an inductive sensor, a capacitive sensor, an optical sensor, an ultrasonic sensor, and/or a magnetic sensor. As depicted in FIG. 4, in an embodiment, the sensor(s) 310 may be communicatively coupled to the controller 200 via a wired coupling or via a wireless coupling. It should be appreciated that in an embodiment wherein the sensor(s) 310 is coupled to the outer body 304, the physical separation ($S_1$) may defined between the sensor(s) 310 and the inner body 308.

In an embodiment, the sensor(s) 310 may be oriented toward a sensor target 330. The sensor target 330 may be integral with the cavity wall 314. In an embodiment, the sensor target 330 may be a region of the cavity wall 314 having a plane parallel to a viewing plane of the sensor(s) 310. For example, the sensor target 330 may be a machined flat region of the cavity wall 314 paralleling a corresponding mounting region 332 of the inner body 308. The mounting region 332 being formed to securely couple the sensor(s) 310 thereon.

It should also be appreciated that, as used herein, the term "monitor" and variations thereof indicates that the sensor(s) 310 of the wind turbine 100 may be configured to provide a direct measurement of the parameters being monitored or an indirect measurement of such parameters. Thus, the sensors described herein may, for example, be used to generate signals relating to the parameter being monitored, which can then be utilized by the controller 200 to determine a condition or response of the wind turbine 100.

In an embodiment, the sensor(s) 310 may also include such additional sensors as may improve the detection of the deflection of the outer body 304 in response to the load of the load path. For example, in an embodiment, the sensor(s) 310 may include a temperature sensor, an accelerometer, and/or a hybrid sensor. It should be appreciated that the inclusion of additional sensor types may improve the calibration and/or filtering of a sensor signal by providing an increased awareness of conditions affecting the proximity sensor.

Figure 7:
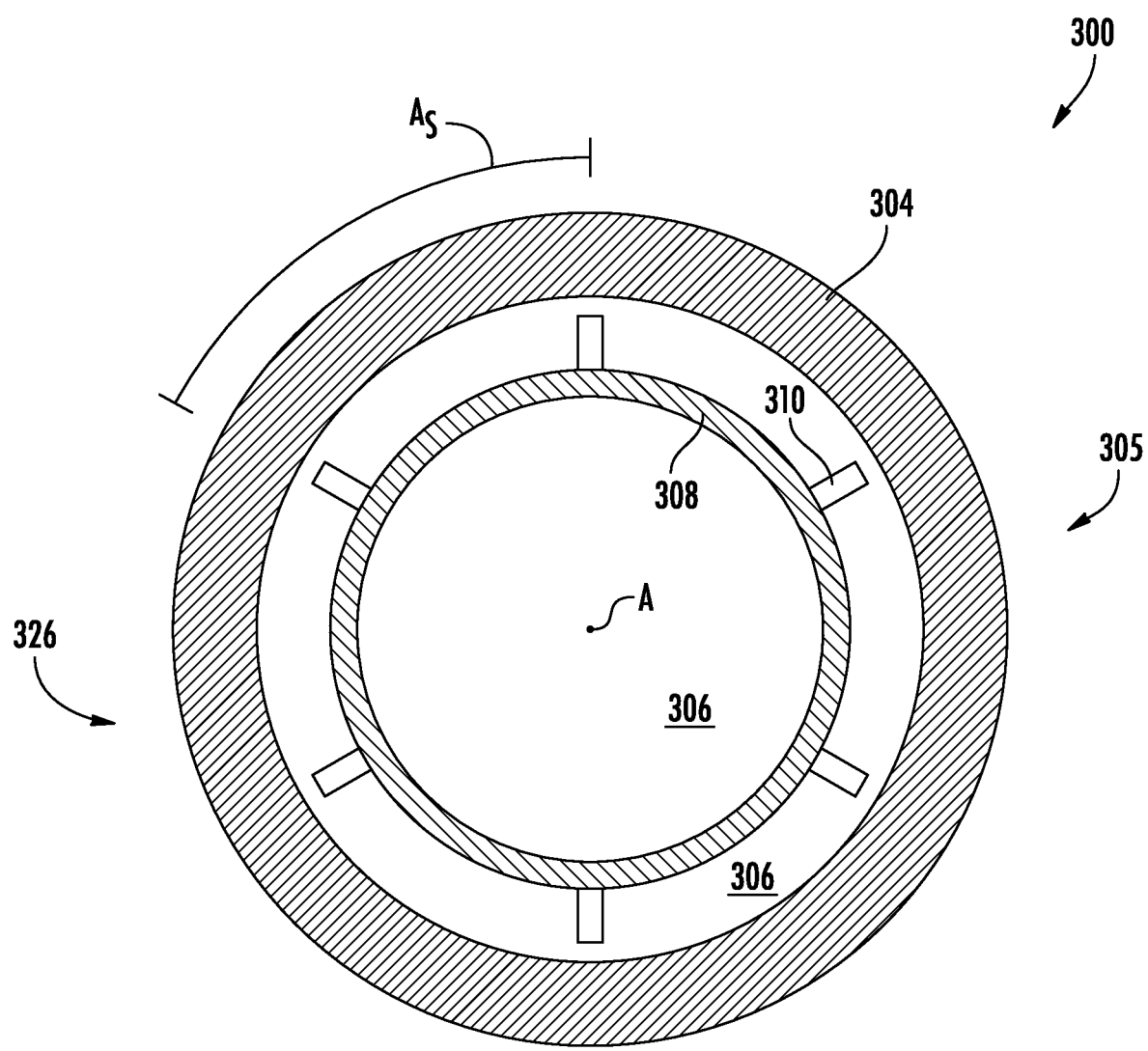
FIG. 7 illustrates a cross-sectional view of one embodiment of a component assembly of the wind turbine according to the present disclosure.

Referring now to FIGS. 7 and 8, in an embodiment, the sensor 310 may be one of an array of sensors 326. In an embodiment, the array of sensors 326 may include as few as two sensors 310. In an additional embodiment, the array of sensors 326 may include three sensors separated by 120 degrees so as to align with a three-bladed rotor 108. However, in an additional embodiment, the array of sensors 326 may include four or more sensors 310 (e.g., five sensors 310). For example, as shown in FIG. 7, the array of sensors 326 may include six proximity sensors 310.

It should be appreciated that increasing the number of sensors may provide multiple advantages to the assembly 300. For example, increasing the number of sensors 310 may increase the accuracy of the assembly 300 by increasing the number of collection points of the deflection data. When receiving indications of deflection from multiple sensors 310 of the array of sensors 326, the controller 200 may correlate the magnitude of the reported deflections, thereby determining a focal point and direction of the deflection. Furthermore, the multiple indications may facilitate the detection of a malfunctioning sensor. Accordingly, the number of sensors 310 of the array of sensors 326 may provide system redundancy thereby reducing potential maintenance intervals. It should thus be appreciated that an array of sensors 326 having at least five sensors 310 may be desirable.

In an embodiment, each sensor 310 of the array of sensors 326 may define an angular separation with at least one adjacent sensor 310. The angular separation (As) may be relative to the axis (A). Accordingly, the array of sensors 326 may be axially aligned at a first axial location ($A_1$) along the axis (A) of the outer body 304. For example, in an embodiment, the array of sensors may circumscribe the inner body 308 such that each sensor 310 of the array of sensors 326 defines a circumferential separation with at least one adjacent sensor 310 of the array of sensors 326 (e.g., angular separation ($A_S$)). In an embodiment, the array of sensors 326 may be distributed equidistantly about the circumference of the inner body 308.

As depicted in FIG. 4, in an embodiment, each sensor 310 of the array of sensors 326 may be communicatively coupled to a sensor junction box 328. In an embodiment, the sensor junction box 328 may be positioned outside the cavity 306. For example, in an embodiment, the sensor junction box 328 may be coupled to the sealing member 324 or the outer surface 320 of the outer body 304. The sensor junction box 328 may consolidate the signals from the array of sensors 326 for transmission to the controller 200. The consolidated signals may be transmitted to the controller 200 via a conduit 380 positioned within the outer body 304.

Referring again to FIG. 3-8, in an embodiment, the inner body 308, being non-loadbearing with respect to the load, may provide a stable reference point from which to observe the radial deformation of the outer body 304. In an embodiment, the inner body 308 may have a cross-sectional shape which corresponds to the cross-sectional shape of the cavity 306 as defined by the cross sections 305 of the outer body 304. In an embodiment, the distance between the inner body 308 and the cavity wall 314 may be minimized by maximizing the diameter of the inner body 308. Maximizing the cross-sectional area of the inner body 308 within the available space may result in an increase in the rigidity of the inner body 308. The increase in rigidity of the inner body 308 may increase the accuracy of the sensor(s) 310 by limiting the effects of vibration or other incidental movements on the measurements of deflection by the sensor(s) 310. In an embodiment, the inner body 308 may define a second cavity 309 therein. The second cavity 309 may be positioned inward of the inner body 308.

In an embodiment, the inner body 308 may be coupled to the outer body 304 at a second axial location ($A_2$) within the cavity 306. Coupling the inner body 308 at the second axial location ($A_2$) may form a cantilever extending at least axially between the second axial location ($A_2$) and the sensor(s) 310. It should be appreciated that the cantilever structure of the inner body 308 may preclude the transfer of the load from the load path defined by the outer body 304 the inner body 308. As a result, the inner body 308 may maintain the sensor(s) 310 at a relatively constant radial distance ($RD_1$) from the axis while the outer body 304 deflects in response to the load.

As depicted in FIG. 5, in an embodiment, the sensor(s) 310 may have a first sensitivity at a first cantilever axial length ($CL_1$). The sensor(s) 310 may have a second sensitivity corresponding to a second cantilever axial length ($CL_2$). In an embodiment, the second cantilever axial length ($CL_1$) may be greater than the first cantilever axial length ($CL_2$). In such an embodiment, the second sensitivity may be greater than the first sensitivity of the sensor(s) 310. In other words, the length of the cantilever may be tailored to adjust the sensitivity of the sensor(s) 310. For example, the axial position of the second axial location ($A_2$) may be customized in order to manage the incidental motion of the sensor(s) 310 at the mounting location 332. It should be appreciated that the incidental motion may, for example, result from vibrations, rotational speed changes, inertia and/or other forces not directly attributable to the load transmitted by the outer body 304.

Referring still to FIG. 5, in an embodiment, the inner body 308 may be coupled to the outer body 304 via a mounting element 334. In an embodiment the mounting element 334 may, for example, be an expandable plug disposed within the cavity 306. In an embodiment, the mounting element 334 may be generally ring-shaped and may be coaxial with the outer body 304. The axial positioning of the mounting element 334 may be determined by the cantilever axial length required to achieve the desired sensitivity, fidelity, and/or accuracy of the sensor(s) 310.

In an embodiment, the assembly 300 may also include at least one second sensor 336. The second sensor(s) 336 may be coupled to the inner body 308 at a third axial location ($A_3$). In such an embodiment, the second axial location ($A_2$) may be disposed between the first axial location ($A_1$) and the third axial location ($A_3$). In other words, the inner body 308 may form a cantilever extending in both axial directions from the support element 334. In such an embodiment, the employment of axially displaced sensor(s) 310 may increase the fidelity of the sensor input to the controller 200 and may provide indications of lateral and/or vertical displacements of the outer body 304.

Referring again to FIG. 4, as depicted, in an embodiment, the outer body 304 and the inner body 308 may be a unitary body having an absence of a joint therebetween. Accordingly, the outer body 304 and the inner body 308 may be simultaneously manufactured. For example, the unitary body may be formed via casting, milling, and/or additive manufacturing. It should be appreciated that simultaneously forming the unitary body may preclude a possibility of displacements and/or misalignments at a joint between the inner body 308 and the outer body 304.

In an additional embodiment, such as particularly depicted in FIG. 6, the outer body 304 and the inner body 308 may be formed separately. In an embodiment, the inner body 308 may be formed within the cavity 306 so as to fuse with the outer body 304. For example, in an embodiment, the inner body 308 may be additively manufactured directly within the recess 306 following the formation of the outer body 304. In an additional embodiment, the outer body 304 and the inner body 308 may be formed independently using known manufacturing techniques. Following its formation, the inner body 308 may be inserted within the cavity 306 and secured therein via chemical, material, and/or mechanical means.

In an embodiment wherein the outer body 304 and the inner body 308 may be formed independently, the outer body 304 may be formed from a first material. In such an embodiment, the inner body 308 may be formed from a second material, which is different than the first material. It should be appreciated that the selection of the first and second materials may be driven by the operational design of the components. For example, the first material may be selected so as to support the definition of the load path for the transfer of the load of the wind turbine 100, while the second material may be selected to balance a desired rigidity of the inner body 308 with a desire for a relatively lightweight structure.

Figure 9:
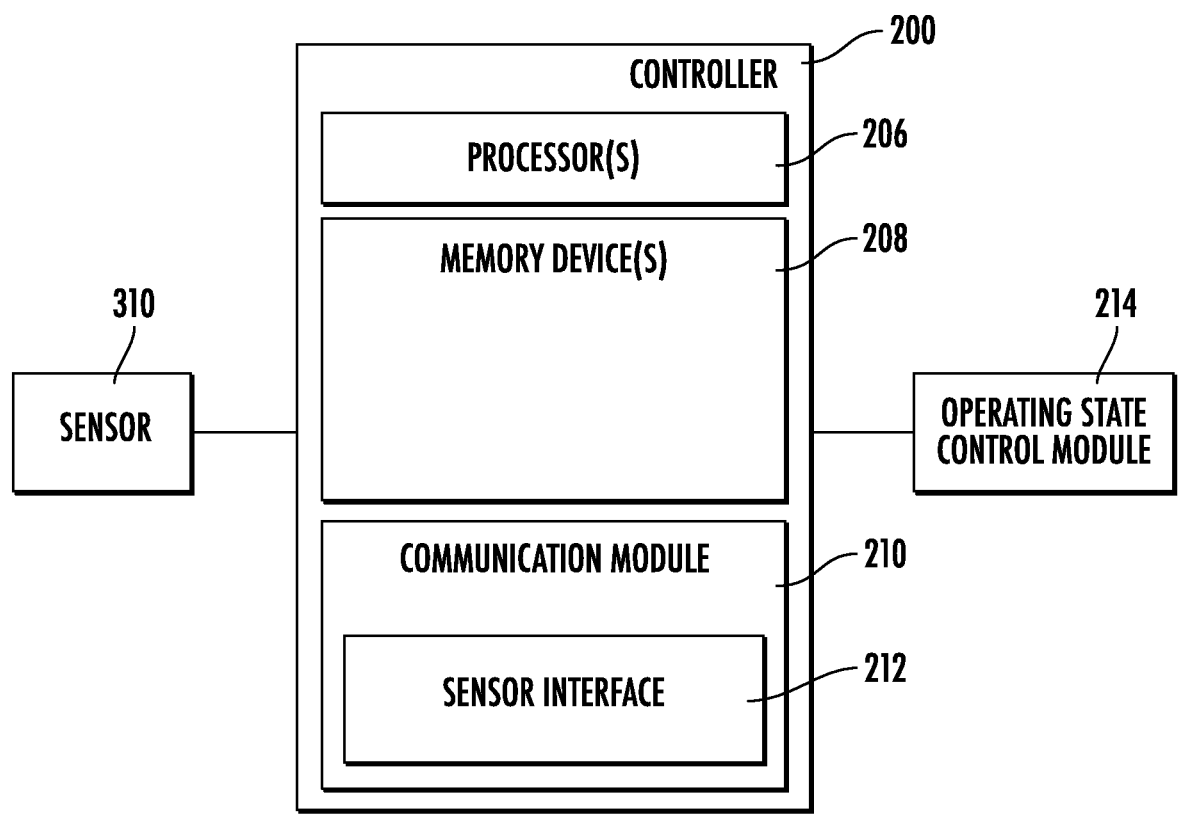
FIG. 9 illustrates a schematic diagram of one embodiment of a controller for use with the wind turbine according to the present disclosure.

Referring now to FIG. 9, a schematic diagram of one embodiment of a controller coupled communicatively to the sensor(s) 310 is illustrated. As shown, the controller 200 includes one or more processor(s) 206 and associated memory device(s) 208 configured to perform a variety of computer-implemented functions (e.g., performing the methods, steps, calculations and the like and storing relevant data as disclosed herein). Additionally, the controller 200, may also include a communications module 210 to facilitate communications between the controller 200, and the various components of the wind turbine 100. Further, the communications module 210 may include a sensor interface 212 (e.g., one or more analog-to-digital converters) to permit signals transmitted from the sensor(s) 310 to be converted into signals that can be understood and processed by the processors 206. It should be appreciated that the sensor(s) 310 may be communicatively coupled to the communications module 210 using any suitable means. For example, the sensor(s) 310 may be coupled to the sensor interface 212 via a wired connection. However, in other embodiments, the sensor(s) 310 may be coupled to the sensor interface 212 via a wireless connection, such as by using any suitable wireless communications protocol known in the art. Additionally, the communications module 210 may also be operably coupled to an operating state control module 214 configured to change at least one wind turbine operating state.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform various functions including, but not limited to, detecting an anonymous operational event and initiating an enhanced braking mode for the wind turbine 100 as described herein, as well as various other suitable computer-implemented functions.

Figure 10:
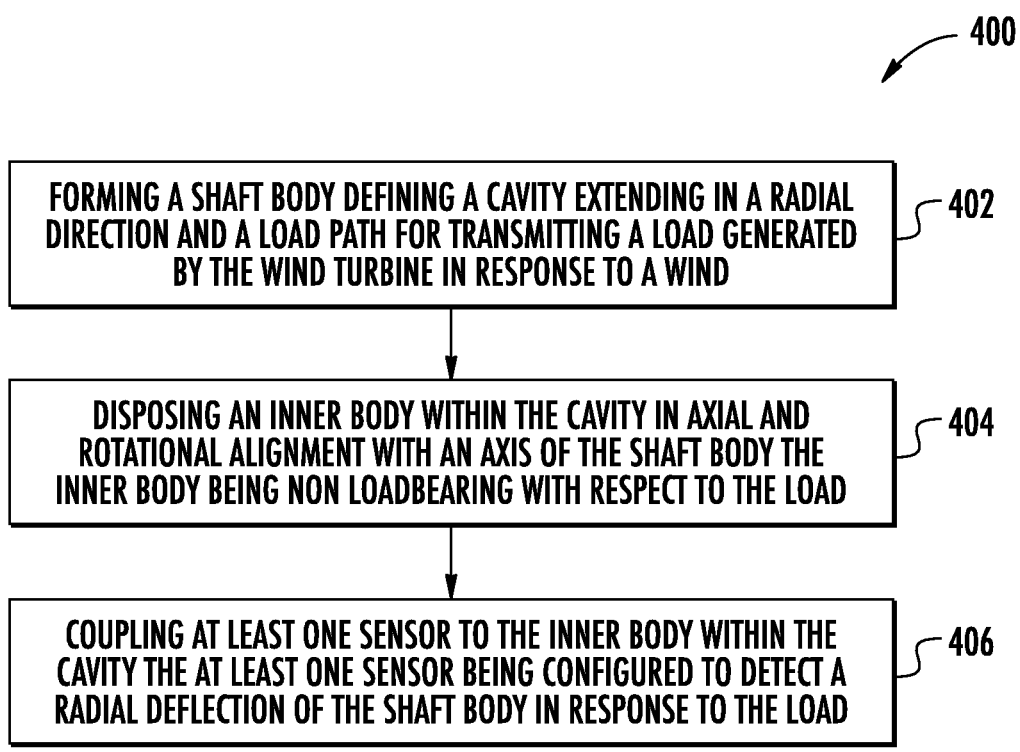
FIG. 10 illustrates a flow diagram of one embodiment of a method for manufacturing a shaft assembly of a wind turbine according to the present disclosure.

Referring to FIG. 10, a flow diagram of one embodiment of a method 400 for manufacturing a shaft assembly of a wind turbine is presented. The method 400 may be implemented to manufacture the load bearing assembly 300 and/or the shaft assembly 302 discussed above with reference to FIGS. 3-8. FIG. 10 depicts steps performed in a particular order for purposes of illustration and discussion. Those of ordinary skill in the art, using the disclosures provided herein, will understand that various steps of the method 400 or any of the other methods disclosed herein may be adapted, modified, rearranged, performed simultaneously or modified in various ways without deviating from the scope of the present disclosure.

As shown at (402), the method 400 includes forming a shaft body defining a cavity extending in a radial direction and a load path for transmitting a load generated by the wind turbine in response to a wind. As shown at (404), the method 400 includes disposing an inner body within the cavity in axial and rotational alignment with an axis of the shaft body, the inner body being non-loadbearing with respect to the load. Additionally, as shown at (406), the method 400 includes coupling at least one sensor to the inner body within the cavity, the at least one sensor being configured to detect a radial deflection of the shaft body in response to the load.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims. Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Further aspects of the invention are provided by the subject matter of the following clauses:

Clause 1. A shaft assembly of a wind turbine, the shaft assembly comprising: a shaft body defining a cavity therein and a load path for transmitting a load generated by the wind turbine in response to wind; an inner body disposed within the cavity and coupled to the shaft body, the inner body being non-loadbearing with respect to the load, wherein the shaft body and the inner body are concentric and have a synchronized rate of rotation about an axis; and at least one sensor coupled to the inner body and positioned within the cavity for detecting a deflection of the shaft body in response to the load.

Clause 2. The shaft assembly of clause 1, wherein the coupling of the at least one sensor to the inner body defines a physical separation between the at least one sensor and an adjacent wall of the cavity in a radial direction.

Clause 3. The shaft assembly of any preceding clause, wherein the at least one sensor comprises a proximity sensor, the proximity sensor being configured to indicate a radial deflection of the shaft body.

Clause 4. The shaft assembly of any preceding clause, wherein the at least one sensor comprises an array of sensors disposed at a first axial location of the axis, the array of sensors circumscribing the inner body, each sensor of the array of sensors defining a circumferential separation with at least one adjacent sensor of the array of sensors.

Clause 5. The shaft assembly of any preceding clause, wherein the at least one sensor is coupled to the inner body at a first axial location along the axis and the inner body is coupled to the shaft body at a second axial location within the cavity, the inner body forming a cantilever extending at least axially between the second axial location and the at least one sensor.

Clause 6. The shaft assembly of any preceding clause, wherein the shaft body and the inner body are a unitary body having an absence of a joint therebetween.

Clause 7. The shaft assembly of any preceding clause, wherein the inner body is coupled within the cavity after formation, the shaft body comprising a first material, and the inner body comprising a second material which is different than the first material.

Clause 8. A component assembly of a wind turbine, the assembly comprising: wind turbine component comprising: an outer body defining a cavity therein, the outer body defining a load path for transmitting a load of the wind turbine therethrough, and an inner body disposed within the cavity of the outer body, the inner body being non-loadbearing with respect to the load; and at least one sensor coupled to the inner body and positioned within the cavity for detecting a deflection of the outer body in response to the load.

Clause 9. The component assembly of any preceding clause, wherein the outer body and the inner body are rotatable during operation of the wind turbine, and wherein the outer body and the inner body are concentric and have a synchronized rate of rotation about an axis.

Clause 10. The component assembly of any preceding clause, wherein the coupling of the at least one sensor to the inner body defines a physical separation between the at least one sensor and an adjacent wall of the cavity.

Clause 11. The component assembly of any preceding clause, wherein the at least one sensor comprises an array of sensors disposed at a first axial location along an axis of the outer body, each sensor of the array of sensors defining an angular separation with at least one adjacent sensor of the array of sensors relative to the axis.

Clause 12. The component assembly of any preceding clause, wherein the at least one sensor is coupled to the inner body at a first axial location along an axis of the outer body and the inner body is coupled to the outer body at a second axial location within the cavity, the inner body forming a cantilever extending at least axially between the second axial position and the at least one sensor.

Clause 13. The component assembly of any preceding clause, wherein the at least one sensor is at least one first sensor, the assembly further comprising: at least one second sensor coupled to the inner body at a third axial location, the second axial location being disposed between the first axial location and the third axial location.

Clause 14. The component assembly of any preceding clause, wherein the wind turbine component is one of a rotor blade, a high-speed shaft, a low-speed shaft, a rotatable hub, a rotor support spindle, or a tower of the wind turbine.

Clause 15. A method for manufacturing a shaft assembly of a wind turbine, the method comprising: forming a shaft body defining a cavity extending in a radial direction and a load path for transmitting a load generated by the wind turbine in response to a wind; disposing an inner body within the cavity in axial and rotational alignment with an axis of the shaft body, the inner body being non-loadbearing with respect to the load; and coupling at least one sensor to the inner body within the cavity, the at least one sensor being configured to detect a radial deflection of the shaft body in response to the load.

Clause 16. The method of any preceding clause, wherein the at least one sensor is coupled to the inner body at a first axial location along the axis, the method further comprising: coupling the inner body to the shaft body at a second axial location within the cavity so as to form a cantilever extending at least axially between the second axial location and the at least one sensor, wherein the at least one sensor has a first sensitivity at a first cantilever axial length and a second sensitivity corresponding to a second cantilever axial length, the second cantilever axial length being greater than the first cantilever axial length and the second sensitivity may be greater than the first sensitivity.

Clause 17. The method of any preceding clause, wherein disposing the inner body within the cavity comprises at least one of casting or additively manufacturing the inner body as a unitary body with the shaft body, the inner body and the shaft body having an absence of a joint therebetween.

Clause 18. The method of any preceding clause, wherein the shaft body comprises a first material, and wherein disposing the inner body within the cavity further comprises: forming the inner body from a second material different than the first material; inserting the inner body into the cavity; and coupling the inner body to an inside face of the shaft body.

Clause 19. The method of any preceding clause, wherein coupling at least one sensor to the inner body comprises: circumscribing the inner body at an axial position with an array of sensors, wherein the array of sensors is distributed equidistantly about a circumference of the inner body.

Clause 20. The method of any preceding clause, further comprising: coupling a sealing member across an opening in the shaft body defined by the cavity.

What is claimed is:

1. A shaft assembly of a wind turbine, the shaft assembly comprising:
   a shaft body defining a cavity therein and a load path for transmitting a load generated by the wind turbine in response to wind;
   an inner body disposed within the cavity and coupled to the shaft body, the inner body being non loadbearing with respect to the load, wherein the shaft body and the inner body are concentric and have a synchronized rate of rotation about an axis; and
   at least one sensor coupled to the inner body at a first axial location along the axis and positioned within the cavity for detecting a deflection of the shaft body in response to the load,
   wherein the inner body is coupled to the shaft body at a second axial location within the cavity, the inner body forming a cantilever extending at least axially between the second axial location and the at least one sensor.

2. The shaft assembly of claim 1, wherein the coupling of the at least one sensor to the inner body defines a physical separation between the at least one sensor and an adjacent wall of the cavity in a radial direction.

3. The shaft assembly of claim 2, wherein the at least one sensor comprises a proximity sensor, the proximity sensor being configured to indicate a radial deflection of the shaft body.

4. The shaft assembly of claim 1, wherein the at least one sensor comprises an array of sensors disposed at the first axial location of the axis, the array of sensors circumscribing the inner body, each sensor of the array of sensors defining a circumferential separation with at least one adjacent sensor of the array of sensors.

5. The shaft assembly of claim 1, wherein the shaft body and the inner body are a unitary body having an absence of a joint therebetween.

6. The shaft assembly of claim 1, wherein the inner body is coupled within the cavity after formation, the shaft body comprising a first material, and the inner body comprising a second material which is different than the first material.

7. A component assembly of a wind turbine, the assembly comprising:
   a wind turbine component comprising:
   an outer body defining a cavity therein, the outer body defining a load path for transmitting a load of the wind turbine therethrough, and
   an inner body disposed within the cavity of the outer body, the inner body being non loadbearing with respect to the load; and at least one sensor coupled to the inner body at a first axial location along the axis and positioned within the cavity for detecting a deflection of the outer body in response to the load, wherein the inner body is coupled to the shaft body at a second axial location within the cavity, the inner body forming a cantilever extending at least axially between the second axial location and the at least one sensor.

8. The component assembly of claim 7, wherein the outer body and the inner body are rotatable during operation of the wind turbine, and wherein the outer body and the inner body are concentric and have a synchronized rate of rotation about an axis.

9. The component assembly of claim 7, wherein the coupling of the at least one sensor to the inner body defines a physical separation between the at least one sensor and an adjacent wall of the cavity.

10. The component assembly of claim 7, wherein the at least one sensor comprises an array of sensors disposed at the first axial location along an axis of the outer body, each sensor of the array of sensors defining an angular separation with at least one adjacent sensor of the array of sensors relative to the axis.

11. The component assembly of claim 7, wherein the at least one sensor is at least one first sensor, the assembly further comprising:
at least one second sensor coupled to the inner body at a third axial location, the second axial location being disposed between the first axial location and the third axial location.

12. The component assembly of claim 7, wherein the wind turbine component is one of a rotor blade, a high speed shaft, a low speed shaft, a rotatable hub, a rotor support spindle, or a tower of the wind turbine.

13. A method for manufacturing a shaft assembly of a wind turbine, the method comprising:
forming a shaft body defining a cavity extending in a radial direction and a load path for transmitting a load generated by the wind turbine in response to a wind;
disposing an inner body within the cavity in axial and rotational alignment with an axis of the shaft body, the inner body being non loadbearing with respect to the load; and
coupling at least one sensor to the inner body at a first axial location along the axis within the cavity, the at least one sensor being configured to detect a radial deflection of the shaft body in response to the load,
coupling the inner body to the shaft body at a second axial location within the cavity so as to form a cantilever extending at least axially between the second axial location and the at least one sensor, wherein the at least one sensor has a first sensitivity at a first cantilever axial length and a second sensitivity corresponding to a second cantilever axial length, the second cantilever axial length being greater than the first cantilever axial length and the second sensitivity may be greater than the first sensitivity.

14. The method of claim 13, wherein disposing the inner body within the cavity comprises at least one of casting or additively manufacturing the inner body as a unitary body with the shaft body, the inner body and the shaft body having an absence of a joint therebetween.

15. The method of claim 13, wherein the shaft body comprises a first material, and wherein disposing the inner body within the cavity further comprises:
forming the inner body from a second material different than the first material;
inserting the inner body into the cavity; and
coupling the inner body to an inside face of the shaft body.

16. The method of claim 13, wherein coupling at least one sensor to the inner body comprises:
circumscribing the inner body at the first axial location with an array of sensors, wherein the array of sensors is distributed equidistantly about a circumference of the inner body.

17. The method of claim 13, further comprising:
coupling a sealing member across an opening in the shaft body defined by the cavity.

* * * * *